3,065,046
PROCESS FOR RECOVERING TANTALUM AND NIOBIUM VALUES FROM ORGANIC SOLUTIONS
Raymond A. Foos, Loveland, and Harry Greenberg, Cincinnati, Ohio, assignors to National Distillers and Chemical Corporation, New York, N.Y., a corporation of Virginia
No Drawing. Filed Apr. 6, 1959, Ser. No. 804,074
11 Claims. (Cl. 23—18)

The present invention relates to a new and improved method for recovering metal values. More particularly, the invention pertains to a novel process wherein tantalum and columbium values or mixtures thereof are recovered from organic solutions containing the same.

In a number of recently proposed processes tantalum and columbium metals are produced by reduction of the corresponding alkali metal-fluoride double salts with alkali metal reductants such as sodium, potassium, lithium or mixtures thereof. Starting with the appropriate ores, these processes have, in general, involved the following sequential steps: (1) ore opening; (2) leaching and conversion of the tantalum and columbium values to a form whereby they can be easily fluorinated; (3) reaction of the resulting tantalum and columbium compounds with hydrofluoric acid to obtain their conversion to the fluotantalate and the fluocolumbates; (4) contacting the resulting mixture with a water-immiscible, oxygen-containing, organic solvent, such as methyl isobutyl ketone (often referred to as hexone), and separating an organic, preferentially tantalum-containing phase, from an aqueous columbium-containing phase; (5) extracting the tantalum values from the organic phase with a water extractant to obtain an aqueous tantalum-containing phase; (6) acidification of the aqueous phase of step (4) containing the columbium values; (7) purifying the columbium values in this aqueous phase by first transferring the fluocolumbate to an organic phase by extraction with a water-immiscible, oxygen-containing, organic solvent, and then extracting the resulting organic phase with water to remove the columbium values in an aqueous phase; (8) separately crystallizing the tantalum and columbium values, in the form of the potassium fluoride double salts, from the respective aqueous phases at elevated temperatures by reaction with a potassium-containing compound such as potassium fluoride and slow cooling, and (9) reduction of the recovered potassium fluoride double salts of tantalum and columbium with an alkali metal reductant, as described above, to produce tantalum and columbium metals, respectively.

The improvement of the present invention is concerned primarily with steps (5) to (8) of the above-described process, wherein the tantalum and columbium values in the organic phases are transferred to aqueous phases by extraction with water prior to being crystallized by reaction with the potassium-containing compound. The other processing steps do not form a part of this invention. In actual operations it was found that there were a number of serious disadvantages in following sequential steps (5) to (8). For one thing, these procedures require careful control of such conditions as temperature, time, and concentrations of hydrofluoric acid, potassium salt, tantalum and columbium. Furthermore, the yields of the potassium double fluoride salts were significantly lowered by the necessity for aqueous extraction and recrystallization from water several times in order to obtain double fluoride salts of sufficient purity for the reduction step. This is because in aqueous solutions the tantalum and columbium ions are surrounded by water molecules, thus encouraging occlusion of water during crystallization as well as the formation of oxyfluorides. It was essential, therefore, in these processes to recycle numerous organic phases and aqueous filtrates so as to obtain substantially complete recovery of the tantalum and columbium values in a purity suitable for high grade metal production. Such procedures are obviously undesirable in that they involve additional equipment and handling problems.

One object of this invention is to provide a process which avoids the aforementioned difficulties. Another object of this invention is to provide a process which eliminates the need to extract the tantalum and columbium values with water from the organic phases or solutions prior to reaction with the potassium-containing compound. A further object of this invention is to provide a process wherein outstanding yields of the potassium fluotantalates and columbates are achieved. A still further object of this invention is the preparation of high purity tantalum and columbium metals from such double fluoride salts.

These and other objects of the invention are accomplished by effecting the direct precipitation or crystallization of the double fluoride salts from the above-described organic solutions or phases. More specifically, the organic solutions containing the tantalum and columbium values are contacted with a potassium-containing compound at room temperature to obtain the potassium fluotantalate and fluocolumbate. The inorganic potassium-containing compound may be any one of the following: potassium fluoride, potassium chloride, potassium carbonate, potassium hydroxide and the like. Although other equivalent sodium compounds may also be employed, potassium compounds are preferred. Illustrative examples of the reactions which take place are as follows:

(1) $H_2TaF_7 + 2KF \rightarrow K_2TaF_7 + 2HF$, or
(2) $H_2TaF_7 + 2KOH \rightarrow K_2TaF_7 + H_2O$, etc.

Similar reactions will, of course occur, when columbium or mixtures of tantalum and columbium values are present in the organic phase or solution.

The metal-containing organic solutions employed in the process of this invention may be tantalum and/or columbium values. The major proportion of the solution will comprise a water-immiscible, oxygen-containing, organic solvent. Examples of operable solvents include diethyl ketone, methyl isobutyl ketone (hexone or MIBK), cyclohexanone, tributyl phosphate, diethyl ether, diisopropyl ether, amyl alcohol, m-toluidine, and the like. The use of methyl isobutyl ketone is, however, preferred. The concentration of the tantalum and columbium values, calculated as metal oxide, may be as low as a few grams per liter and still result in effective precipitation. For efficient operations, however, about 30 grams per liter should be considered a minimum. Although concentrations as high as 170 grams per liter of tantalum oxide and 58 grams per liter of columbium oxide have been effectively utilized, no maximum metal concentration has been found. The organic solutions will also contain some free hydrofluoric acid, which may range from about 1 to 20 grams per liter of organic solution. When potassium fluoride is used in the reaction, high concentrations of hydrofluoric acid eventually result due to the liberation of hydrofluoric acid in the small amount of water layer formed in the course of the precipitation. This is advantageous in that the hydrofluoric acid protects the potassium salt of tantalum and columbium from possible oxyfluoride contamination. Since in the case of columbium the tendency to form the oxyfluoride is more pronounced, conditions are preferably arranged to yield an aqueous layer having about a 6 to 12N hydrofluoric acid concentration. For illustrative purposes a typical methyl isobutyl ketone solution containing $H_2TaF_7$ will analyze as follows:

169.3 grams/liter Ta$_2$O$_5$
103.4 grams/liter of total fluoride
1.69 grams/liter of excess hydrofluoric acid
13.8% by volume of water It will be understood, however, that other tantalum and/or columbium-containing organic solutions may be employed in the process of this invention. Thus, considering the prior art process previously described, the total solution of step (4) or the organic solutions of steps (5) and (7) may be utilized in this process.

The reaction between the potassium-containing compound and the tantalum and/or columbium values in the organic solutions can be carried out at room temperatures, preferably about 25° to 60° C. with a mole ratio of the potassium compound to the metal values of about 1.9:1 to 2.5:1. In general, however, stoichiometric amounts of the potassium compound will be employed, although a small excess can be tolerated in view of the very low solubility of the potassium compounds in the organic solvents and their high solubility in water. As a result of the foregoing reaction, three distinct phases are produced: (1) a crystal or precipitate phase comprising the potassium double fluoride salt or salts; (2) a top organic solvent layer containing a small amount of water; and (3) a lower water layer containing the hydrofluoric acid, some of the potassium double salt and a trace of the organic solvent.

The crystals or precipitate of the potassium fluotantalate and/or potassium fluocolumbate are recovered from the resulting mixture by utilizing conventional filtration techniques and apparatus. The resulting filter cake can be washed with fresh methyl isobutyl ketone, acetone, ethyl alcohol, methyl alcohol, ethyl ether, and the like to remove the final traces of water. It is also possible to initially wash the filter cake with cold 2 to 20% hydrofluoric acid to recover adherent mother liquor containing metallic contaminants. Following the washing, the filter cake is dried at a temperature of about 40° to 120° C.

The dried potassium double flouride salts are then reacted with known reducing agents, as described above, to produce the corresponding tantalum metal, columbium metal or mixtures thereof. The use of metallic sodium as the reducing agent is preferred. Using the potassium fluotantalate salt as an example, the reaction is as follows:

K$_2$TaF$_7$+5Na→5NaF+2KF+Ta

In general, the reaction is carried out in an inert atmosphere, e.g. argon, neon or mixtures thereof, at a temperature of about 200° to 700° C., preferably about 400° to 500° C. The reaction product is a fused mixture of metallic tantalum, columbium or mixtures thereof and by-product salt. The metal product is recovered by grinding or crushing the fused reaction product mixture followed by leaching with dilute mineral acids or water at a temperature of about 20° to 90° C. If desired, the metal product so obtained can be dried at a temperature of about 50° to 150° C.

The invention will be more fully understood by reference to the following illustrative examples.

*Example I*

To 1300 ml. of a stirred hexone extract (containing one mol of tantalum and having the following composition, Ta$_2$O$_5$—169.3 g./l.; total—F—103.5 g./l.; H$_2$O—13.8% by volume) maintained at 25° C., 188.2 g. KF·2H$_2$O (2 moles) were added. A slight exothermic reaction began immediately. A thick doughy paste composed of K$_2$TaF$_7$ crystals and water formed in the depleted hexone. The three phase system was stirred for 1 hour. Filtration by suction gave a filter cake of K$_2$TaF$_7$ and a two phase filtrate consisting of hexone and water containing HF and a trace of double fluoride. The cake was washed with cold 3% hydrofluoric acid followed by acetone. Yield of K$_2$TaF$_7$ was 97.5% of theory. This salt on reduction with sodium gave tantalum sponge with 118 Brinell hardness.

*Example II*

To a stirred columbium extract in hexone containing 0.625 mole as H$_2$CbF$_7$ and analyzing 58.3 g. Cb$_2$O$_5$/l. was added, at room temperature, a 50% solution of KF·2H$_2$O (1.25 moles). The double fluoride formed immediately as a thick paste with the water present in the system. After one hour the crystals were filtered off, washed with cold 3% HF and acetone and the liquid phases, water-hexone separated.

The salt weighed 174 g.; theory=190 g., and the aqueous layer had a volume of 100 ml. and contained 7.07 g. Cb$_2$O$_5$ (16 g. K$_2$CbF$_7$). The hexone phase on analysis contained only traces of columbium.

*Example III*

To 3025 ml. of a stirred hexone extract (1 mole H$_2$TaF$_7$) (analyzing 73.7 g. Ta$_2$O$_5$/l.; 52.0 g. —F/l.) was added a 50% aqueous solution of KOH (2 moles). The hexone solution contained enough excess HF over tantalum requirements to give a 0.4 N solution. The strong KOH solution was added dropwise over a period of 5.5 hours. A dough-like product was formed long before all the KOH was introduced. Stirring was continued for 30 minutes after completion of KOH addition. Filtration by suction followed by washing with fresh hexone and drying, gave a snow white K$_2$TaF$_7$ in 95.7% yield. The recovered hexone had a volume of 2880 ml. and a water layer (230 ml.) was also isolated. This contained 15 g. of K$_2$TaF$_7$ and the hydrofluoric acid present in the system originally.

On reduction with metallic sodium, tantalum sponge with 82.5 BHN was obtained in 98.5% yield.

*Example IV*

Starting material for this experiment was a hexone columbium solution with the following analysis:

Cb$_2$O$_5$ _____ 52.6 g./l.
—F _____ 147.5 g./l.=4 N HF in excess.

To 3.8 liters of the above solution (1.5 atoms Cb) was added 192 g. of 88% KOH (3 moles). The KOH was dissolved in 190 ml. H$_2$O and added dropwise with vigorous stirring over a period of 2½ hours with 2 hours of additional stirring. The K$_2$CbF$_7$ was isolated by vacuum filtration followed by washing with fresh methyl isobutyl ketone and drying at 110° at reduced pressure. The hexone recovered was 3175 ml. and the water layer 435 ml. The weight of K$_2$CbF$_7$ recovered was 389.1 g., or a 85.4% yield.

|  | —F, g./l. | Cb$_2$O$_5$, g./l. |
| --- | --- | --- |
| Input | 560 | 200 |
| Recovered: |  |  |
| Hexone | 262 | 14.9 |
| Water | 11.3 | 5.2 |
| K$_2$CbF$_7$ | 170 | 170.0 |

*Example V*

An organic solution containing 197.7 g./l. total oxides equivalent to 24% columbium and 76% tantalum as metal was used in this experiment.

To 500 ml. containing 0.5025 mole metal was added 98.89 g. KF·2H$_2$O (1.05 moles). On stirring, a doughy mass of crystals formed and a temperature rise of 20° C. was noted. The product was filtered through a stainless steel funnel and washed 5 times with small quantities of fresh hexone. The hexone layer gave no precipitate with aqueous ammonia showing the absence of metal values. An aqueous layer of 74 ml. was also obtained, which on analysis gave 8.6 total oxides; 25 g. mixed double fluorides. The crystals after drying at 65° under vacuum weighed 165.32 g., equal to a yield of 86.8%.

On reduction with sodium these mixed double fluorides gave a mixed metal with BHN (Brinell hardness number) of 107.

The foregoing example indicates the possibility of utilizing the inventive method for the preparation of Cb-Ta mixtures via direct precipitation, by-passing separation procedures, but utilizing the fluoride-hexone method for separation of these metals from troublesome metal contaminants.

There are other important advantages to the present process. For example, in the recovery of columbium, when water is used to strip $H_2CbF_7$ from the organic phase, a columbium-containing solution low in hydrofluoric acid concentration is obtained. In order to precipitate $K_2CbF_7$, and not $K_2CbOF_5$, from this aqueous solution, additional hydrofluoric acid, up to about 10 N, must be added. In contrast, the process of the present invention which involves direct precipitation from the organic phase, leads to a solution containing sufficient hydrofluoric acid, since the water content in the organic phase is low. In other words, the hydrofluoric acid concentration based on the water present is quite high. Consequently, the hydrofluoric acid requirement is decreased. The fact that precipitation can be carried out at room temperature is another important advantage. Such operations obviously reduces the costs of carrying out the process by eliminating heat transfer equipment and by making it possible to operate with rubber-lined equipment. On the other hand, it has been found that precipitation at room temperature of $K_2CbF_7$ or $K_2TaF_7$ from aqueous solutions resulted in brittle metal products.

While particular embodiments of this invention are shown above, it will be understood that the invention is obviously subject to variance and modification without departing from its broader aspects.

What is claimed is:

1. A process for recovering metal values selected from the group consisting of tantalum, columbium, and mixtures thereof which comprises (1) adding a potassium-containing compound selected from the group consisting of potassium fluoride, potassium chloride, potassium carbonate, and potassium hydroxide to an organic solution containing (a) a water-immiscible oxygen-containing organic solvent, (b) free hydrofluoric acid in an amount ranging from about 1 to 20 grams per liter of organic solution, and (c) fluocomplexes of said metal values to precipitate potassium double fluoride salts of said metal values and (2) recovering said potassium double fluoride salts, said salts being selected from the group consisting of potassium fluotantalate, potassium fluocolumbate, and mixtures thereof.

2. The process of claim 1 wherein said metal values are tantalum.

3. The process of claim 1 wherein said metal values are columbium.

4. The process of claim 1 wherein said organic solvent is methyl isobutyl ketone.

5. The process of claim 1 wherein said potassium-containing compound is potassium fluoride.

6. The process of claim 1 wherein said potassium-containing compound is potassium hydroxide.

7. In a process for the recovery of metal values selected from the group consisting of tantalum, columbium and mixtures thereof from ores containing said metal values by (1) opening said ores; (2) leaching said opened ores; (3) reacting the metal values in said leached, opened ores with a controlled amount of hydrofluoric acid, and extracting the resulting reaction mixture with a water-immiscible oxygen-containing organic solvent to obtain an organic phase containing tantalum-containing compounds containing free hydrofluoric acid in an amount ranging from about 1 to 20 grams per liter of organic solution, and an aqueous phase containing columbium-containing compounds; and (4) acidifying said aqueous phase with hydrofluoric acid, and then extracting with a water-immiscible solvent to obtain an organic phase containing columbium-containing compounds, the step which comprises the reaction of a potassium compound selected from the group consisting of potassium fluoride, potassium chloride, potassium carbonate and potassium hydroxide with the metal values in said organic phases (3) and (4) to obtain precipitates of the potassium double fluoride salts of said metal values, said salts being selected from the group consisting of potassium fluotantalate, potassium fluocolumbate and mixtures thereof.

8. The process of claim 7 wherein said metal values are tantalum.

9. The process of claim 7 wherein said metal values are columbium.

10. The process of claim 7 wherein said potassium-containing compound is potassium fluoride.

11. The process of claim 7 wherein said potassium-containing compound is potassium hydroxide.

References Cited in the file of this patent

UNITED STATES PATENTS

| | | |
|---|---|---|
| 2,767,047 | Wilhelm et al. | Oct. 16, 1956 |
| 2,819,945 | Ruhoff et al. | Jan. 14, 1958 |
| 2,860,031 | Grinstead | Nov. 11, 1958 |
| 2,871,092 | Wilhelm et al. | Jan. 27, 1959 |
| 2,888,320 | McCord | May 26, 1959 |
| 2,953,453 | Foos | Sept. 20, 1960 |

OTHER REFERENCES

Koerner et al.: "Separation of Niobium and Tantalum by Liquid Extraction," AEC Report ISC–802, December 1956, 63, pages 42–43 of particular interest.

Werning et al. in "Industrial and Engineering Chemistry," vol. 46, No. 4, April 1954, pages 644–652.